United States Patent
Al-Issa et al.

(10) Patent No.: US 11,829,732 B2
(45) Date of Patent: Nov. 28, 2023

(54) SIMPLE OBJECT APPLICATION PROTOCOL WEB SERVICE APPLICATIONS

(71) Applicant: ELM, Riyadh (SA)

(72) Inventors: Abdullah Mohammed Al-Issa, Riyadh (SA); Faisal Mohammed Banaeamah, Riyadh (SA); Ahmad Eyad Sharaf, Riyadh (SA); Ahmed Ibrahim Alsaud, Riyadh (SA)

(73) Assignee: ELM, Riyadh (SA)

( * ) Notice: Subject to any disclaimer, the term of this patent is extended or adjusted under 35 U.S.C. 154(b) by 0 days.

(21) Appl. No.: 17/550,014

(22) Filed: Dec. 14, 2021

(65) Prior Publication Data

US 2023/0185541 A1 Jun. 15, 2023

(51) Int. Cl.
| | |
|---|---|
| *G06F 8/30* | (2018.01) |
| *G06F 21/64* | (2013.01) |
| *G06F 8/10* | (2018.01) |
| *G06F 8/60* | (2018.01) |

(52) U.S. Cl.
CPC ............ *G06F 8/315* (2013.01); *G06F 8/10* (2013.01); *G06F 8/60* (2013.01); *G06F 21/64* (2013.01)

(58) Field of Classification Search
CPC ... G06F 8/315; G06F 8/10; G06F 8/60; G06F 21/64
USPC .................................................. 717/106–121
See application file for complete search history.

(56) References Cited

U.S. PATENT DOCUMENTS

| | | | | |
|---|---|---|---|---|
| 7,278,133 B2* | 10/2007 | Roman | ..................... | G06F 8/00 717/121 |
| 7,610,575 B2* | 10/2009 | Sproule | .................. | G06Q 10/10 717/109 |
| 7,665,064 B2* | 2/2010 | Able | ....................... | G06F 16/95 717/117 |
| 7,698,398 B1* | 4/2010 | Lai | .......................... | G06Q 30/00 709/228 |
| 8,006,140 B2* | 8/2011 | Khanna | ............... | G06F 11/2294 714/48 |
| 8,346,929 B1* | 1/2013 | Lai | .......................... | H04L 67/51 709/226 |

(Continued)

OTHER PUBLICATIONS

AlShahwan et al, "Providing SOAP Web Services and RESTful Web Services from Mobile Hosts", IEEE, pp. 174-179 (Year: 2010).*

(Continued)

*Primary Examiner* — Anil Khatri
(74) *Attorney, Agent, or Firm* — Oblon, McClelland, Maier & Neustadt, L.L.P.

(57) ABSTRACT

Methods, systems, and computer readable media to automatically generate source code for simple object application protocol (SOAP) web services are described. The method can include selecting a type of web service and a web service. The method can also include selecting one or more inputs or one or more outputs corresponding to the type of the selected web service. The method can further include defining one or more conditions for the one or more outputs. The method can also include automatically generating a source code file for the web service based on one or more of the type of web service, the one or more inputs, the one or more outputs, or the one or more conditions, and deploying the source code file to a server. The method can further include generating a document that lists one or more specifications of the web service.

16 Claims, 12 Drawing Sheets

(56) References Cited

U.S. PATENT DOCUMENTS

| | | | |
|---|---|---|---|
| 8,935,743 B2* | 1/2015 | Sarferaz | H04L 63/14 |
| | | | 717/121 |
| 9,436,440 B1* | 9/2016 | Cohen | G06F 9/4492 |
| 2005/0160104 A1* | 7/2005 | Meera | G06F 8/36 |
| 2011/0145218 A1 | 6/2011 | Meyerzon et al. | |
| 2011/0251992 A1 | 10/2011 | Bethlehem et al. | |
| 2016/0098254 A1 | 4/2016 | Paternostro et al. | |
| 2016/0132309 A1* | 5/2016 | Rajasekhar | H04L 67/51 |
| | | | 717/102 |
| 2021/0004226 A1* | 1/2021 | Gungabeesoon | G06F 8/71 |
| 2021/0132935 A1* | 5/2021 | Dinh | G06F 9/4411 |

OTHER PUBLICATIONS

Mizouni et al, "Performance Evaluation of Mobile Web Services", IEEE, pp. 184-191 (Year: 2011).*
Bai et al., "WSDL-Based Automatic Test Case Generation for Web Services Testing", IEEE, pp. 1-6 (Year: 2005).*
Chester, "Cross-Platform Integration with XML and SOAP", IEEE, pp. 26-34 (Year: 2001).*
Lam et al., "A SOAP-based Streaming Content Delivery Framework for Multimedia Web Services", IEEE, pp. 1097-1102 (Year: 2008).*
Santos et al., "Utilizing cross-domain SOAP web services using clientside languages in an Enterprise Mashup Platform", ACM, pp. 1-4 (Year: 2009).*
"Token of Trust Identity Verification", Wordpress Plugins, https://wordpress.org/plugins/token-of-trust/, Feb. 13, 2018, 5 pages.

* cited by examiner

SIMPLE OBJECT APPLICATION PROTOCOL WEB SERVICE APPLICATIONS

BACKGROUND

Technical Field

The present disclosure is directed generally to web services, and, more particularly, to methods, computer readable media, and systems for creating, deploying, and controlling web services including simple object application protocol (SOAP) web services such as data verification services.

Description of the Related Art

FIG. 1 shows communication between client devices (or clients) and an example service provider server 102 that provides services from a group of asset sources. These sources may have a set of assets and/or data that are sought by one or more of the clients (also known as service consumers). A service for a client may require access to one or more assets or data sources, and services provided to clients may partially overlap with each other, which overlaps may lead to repetitive development lifecycles for each service. As each service requires development, testing, and deployment efforts, one or more of these efforts may need to be repeated for the services that overlap. This repetition may waste time and delay availability of a service to a client. As a result, there is a need to automate and simplify service development and delivery process in order to reduce repetition as well as time to deliver the service.

Some implementations of the present disclosure were conceived in light of the above-mentioned problems and limitations.

SUMMARY

Some implementations include a computerized method to automatically generate source code for simple object application protocol (SOAP) web services. The method can include selecting, using one or more processors, a type of web service and a web service, and selecting, using the one or more processors, one or more inputs or one or more outputs corresponding to the type of web service. The method can also include inputting, using the one or more processors, one or more additional inputs to crosscheck the one or more inputs and validate values of the one or more inputs, and defining, using the one or more processors, one or more conditions for the one or more outputs.

The method can further include mapping, using the one or more processors, at least one of the one or more outputs to a different value, and automatically generating, using the one or more processors, a source code file configured to provide the web service, when the source code is executed, wherein the automatically generated source code is based on one or more of the type of web service, the one or more inputs, the one or more outputs, or the one or more conditions. The method can further include deploying, using the one or more processors, the source code file to a server, and generating, using the one or more processors, a document that lists one or more specifications of the web service.

The tool generates a jar file, which is used to be deployed in a server; this jar consists of java specific manifest file, and java classes. The definitions and configurations of created webservice is stored as an xml, and is called a profile. This profile can be loaded later to the tool where the service can be altered.

In some implementations, the web service is a verification service that verifies data across one or more data sources, wherein the one or more data sources correspond to data of one or more of a person, an organization, a vehicle, or an address.

The method can also include automatically generating, by the one or more processors, source code files for two or more new web services simultaneously, wherein a first input of a first web service of the two or more new web services differs from a second input of a second web service of the two or more new web services, and wherein a first output of the first web service differs from a second output of the second web service, and wherein the first web service is different from the second web service. In some implementations, at least one of the one or more conditions is a business rule.

Some implementations can include a system to automatically generate source code for simple object application protocol (SOAP) web services. The system can comprise one or more processors and a non-transitory computer readable storage having software instructions stored thereon configured to cause the one or more processors to perform operations. The operations can include selecting a type of web service and a web service, and selecting one or more inputs or one or more outputs corresponding to the type of web service. The operations can also include inputting one or more additional inputs to crosscheck the one or more inputs and validate values of the one or more inputs, and defining one or more conditions for the one or more outputs. The operations can further include mapping at least one of the one or more outputs to a different value, and automatically generating a source code file configured to provide the web service, when the source code is executed, wherein the automatically generated source code is based on one or more of the type of web service, the one or more inputs, the one or more outputs, or the one or more conditions. The operations can also include deploying the source code file to a server, and generating a document that lists one or more specifications of the web service.

The tool generates a jar file, which is used to be deployed in a server; this jar consists of Java specific manifest file, and Java classes. The definitions and configurations of created webservice is stored as an xml, and is called a profile. This profile can be loaded later to the tool where the service can be altered.

In some implementations, the web service is a verification service that verifies data across one or more data sources, wherein the one or more data sources correspond to data of one or more of a person, an organization, a vehicle, or an address. The operations can also include automatically generating, by the one or more processors, source code for two or more new web services simultaneously, wherein a first input of a first web service of the two or more new web services differs from a second input of a second web service of the two or more new web services, and wherein a first output of the first web service differs from a second output of the second web service, and wherein the first web service is different from the second web service. In some implementations, at least one of the one or more conditions is a business rule.

Some implementations can include a non-transitory computer readable medium having instructions stored therein that, when executed by one or more processors, cause the one or more processors to perform operations to automatically generate source code for simple object application protocol (SOAP) web services. The operations can include selecting a type of web service and a web service, and selecting one or more inputs or one or more outputs corresponding to the type of web service. The operations can also include inputting one or more additional inputs to cross-check the one or more inputs and validate values of the one or more inputs, and defining one or more conditions for the one or more outputs. The operations can further include mapping at least one of the one or more outputs to a different value, and automatically generating a source code file configured to provide the web service, when the source code is executed, wherein the automatically generated source code is based on one or more of the type of web service, the one or more inputs, the one or more outputs, or the one or more conditions. The operations can also include deploying the source code file to a server, and generating a document that lists one or more specifications of the web service.

The tool generates a jar file, which is used to be deployed in a server; this jar consists of java specific manifest file, and java classes. The definitions and configurations of created webservice is stored as an xml, and is called a profile. This profile can be loaded later to the tool where the service can be altered.

In some implementations, the web service is a verification service that verifies data across one or more data sources, wherein the one or more data sources correspond to data of one or more of a person, an organization, a vehicle, or an address. The operations can also include automatically generating, by the one or more processors, source code for two or more new web services simultaneously, wherein a first input of a first web service of the two or more new web services differs from a second input of a second web service of the two or more new web services, and wherein a first output of the first web service differs from a second output of the second web service, and wherein the first web service is different from the second web service. In some implementations, at least one of the one or more conditions is a business rule.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 13 shows an example interface of an exemplary web service generator for viewing the output of a single-row filter in accordance with some implementations;

FIG. 14 shows an example interface of an exemplary web service generator for viewing the output of a multi-row filter in accordance with some implementations.

DETAILED DESCRIPTION

Figure 1:
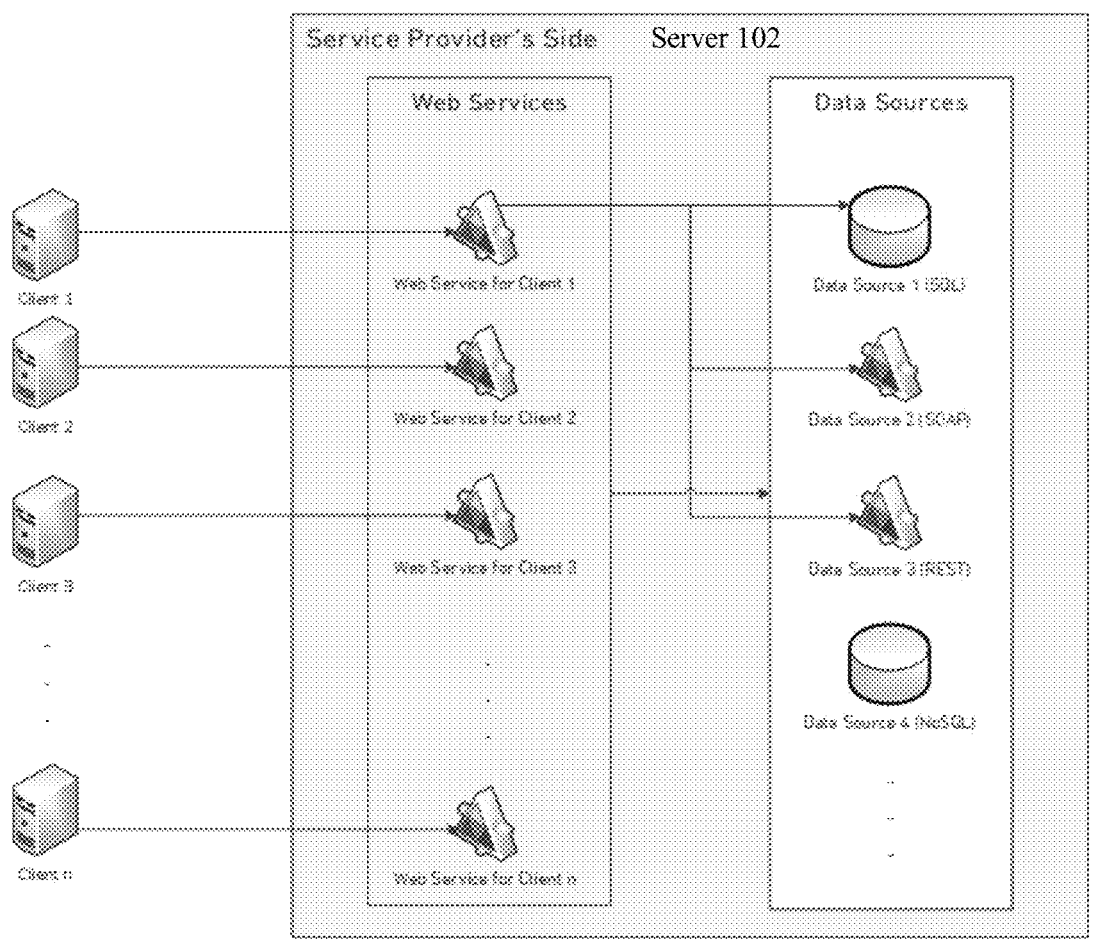
FIG. 1 shows communication between client devices and an example server that provides services from a group of asset sources.

In the drawings, like reference numerals designate identical or corresponding parts throughout the several views. Further, as used herein, the words "a," "an," and the like generally carry a meaning of "one or more," unless stated otherwise. The drawings are generally drawn to scale unless specified otherwise or illustrating schematic structures or flowcharts.

In some implementations, a web service application generator automates service development and delivery lifecycles, thereby enabling a non-technical operator of the web service application to create and deliver a service. This automation can reduce time to market (TTM) and decrease total cost of ownership (TCO) of each service. In some implementations, the automation permits a service provider to adapt to changes in requirements from one client to another. In some implementations, the web service application can create and/or deploy services for multiple domains and rationalize the utilization of time and/or effort during the web service development and delivery.

In some implementations, the web service application generator offers a verification service as a web service. In some implementations, the verification service is an application that creates a service for selection of one or more inputs, verification of the selected inputs across one or more data sources, and provision of one or more outputs. An output can be processed or transformed based on one or more business rules in some implementations.

In some implementations, the verification service application is used to verify data corresponding to a person, an organization, a vehicle, or an address. The application can generate a service contract document with an electronic description of one or more specifications of the service in some implementations. The verification service application helps reduce time to market (TTM) and decrease total cost of ownership (TCO) in some implementations. The verification service application can provide efficient, low-risk, and high-quality services.

In some implementations, a verification service application builds web services using business rule management. The application can thus be implemented within any service that provides verification services involving inputs, outputs, and business rules. For example, the verification service application can be used to provide verification services to customers in multiple domains, such as banking, insurance, and health industries, by verifying data across multiple data sources. In some implementations, the application can build multiple services for different business needs simultaneously with reduced time to market and total cost of ownership. Also, the application permits organizations to present services as web services.

In some implementations, a verification service is a lightweight application, which is interoperable across different platforms and can produce interoperable builds across different environments. In some implementations, the verification service application provides creation of verification services using business rules. The verification service application can automatically generate source code for web services or for source code customization in some implementations. By automatically generating source code for web services, an implementation can improve the efficiency of a computer by generating code that contains fewer errors and that accurately reflects the input and output data types and/or file types associated with a web service. Also, the automatically generated source code can be automatically updated by the system when an underlying input or output changes so that the code remains current and working in a dynamic environment in which interrelated systems may be updated or change. A verification service application can also generate human-readable contracts along with service endpoint contracts.

In some implementations, a web service application creates a web service that accepts inputs, verifies the inputs across different data sources, and returns corresponding outputs. The web service application can be used by service providers to automate development and deployment lifecycles of web services. Web services can include a standardized way of integrating web-based applications using open standards (e.g., extensible markup language (XML), simple object access protocol (SOAP), web services description language (WSDL) and universal discovery, description, and integration (UDDI)) over an Internet Protocol backbone. Often, XML is a data format used to contain web service data and provide metadata around the web service, SOAP is used to transfer the data, WSDL is used for describing the services available and UDDI lists what services are available. In general, a web service can include a method of communication between two electronic devices over a network and is a software function provided at a network address (e.g., an IP address) over the web where the service can be always-on.

In some implementations, the web service application provides options to add business rules to be applied to data retrieved from the data sources before providing the outputs in response. The data can be processed or transformed according to the business needs of a client in some implementations. In some implementations, the web service is a SOAP-based web service and its contract is represented in WSDL (Web Service Description Language). In some implementations, the service is used to verify an entity (e.g., a person, an organization, a vehicle, an address, etc.) based on a set of fields used as inputs to the request (e.g., a person's national ID, a vehicle's registration, etc.), retrieve data from the required data sources, apply business rules and respond with output fields (e.g., a person's name, a vehicle's model, etc.). In some implementations, the web service application provides an option to provide a server path to provide auto deployment across different environments, e.g., testing, staging, and production. In some implementations, the web service application can generate a human-readable integration document to explain in detail one or more specifications of the service to guide the client (i.e., the service consumer) as to how to use the web service.

In some implementations, the web service application is a SOAP web that helps in creating web services for non-developers users. In some implementations, a user can select a type of service, which is a data source as well as the required inputs and outputs. In some implementations, the user can specify one of the inputs as a crosscheck, that it is compared with one of the corresponded service output and used as an input verification. An example of a crosscheck input is when comparing person name which is an input with person name retrieved from a data source. Conditions can be applied to outputs in some implementations, for example, through one or more filters. An example condition excludes all persons with age less than 5 years. In some implementations, one or more outputs can be mapped to a different value. For example, for a government employee or official, an output can map expected occupations to represent that the person works in a government entity. In some implementations, multiple services with different inputs/outputs can be created simultaneously. Some implementations support service versioning as well. In some implementations, the web service application generates a deployable jar file that can be deployed directly to an application server.

In some implementations, a profile is created every time a service is generated. An integration guide can also be generated for the created service in some implementations. In some implementations, a high-level design (HLD) document can be created for the created service. In some implementations, the web service application reduces time/cost to develop and deliver services to clients. In some implementations, the web service application creates custom web services. In some implementations, the web service application generates source code for SOAP web services. In some implementations, the automatically generated source code for the web service application can be used by web service builders to build multiple web services and/or present their services as web services.

In some implementations, the web service application creates a profile in XML format for each created web service for easy editing of the web service in the future, without any further development. In some implementations, the web service application creates a JAR file that can be directly deployed to application servers. In some implementations, the web service application can author an integration guide for a service client. In some implementations, the web service application is written in Java™ to be rumble in any operating system or environment.

In some implementations, the web service application reduces the cost to develop a service, and no development is required in several instances. In some implementations, the web service application also reduces time required for documentation. Time to develop the service is also reduced in some implementations. In some implementations, the web service application reduces resources required to manage web service clients. Examples of resources include developers, testers, and project managers. In some implementations, the web service application speeds up development and delivery of web services and allows easy maintenance of the created services. For example, in some cases, the web services can be developed and delivered in weeks instead of in months.

Architecture

Figure 2A:
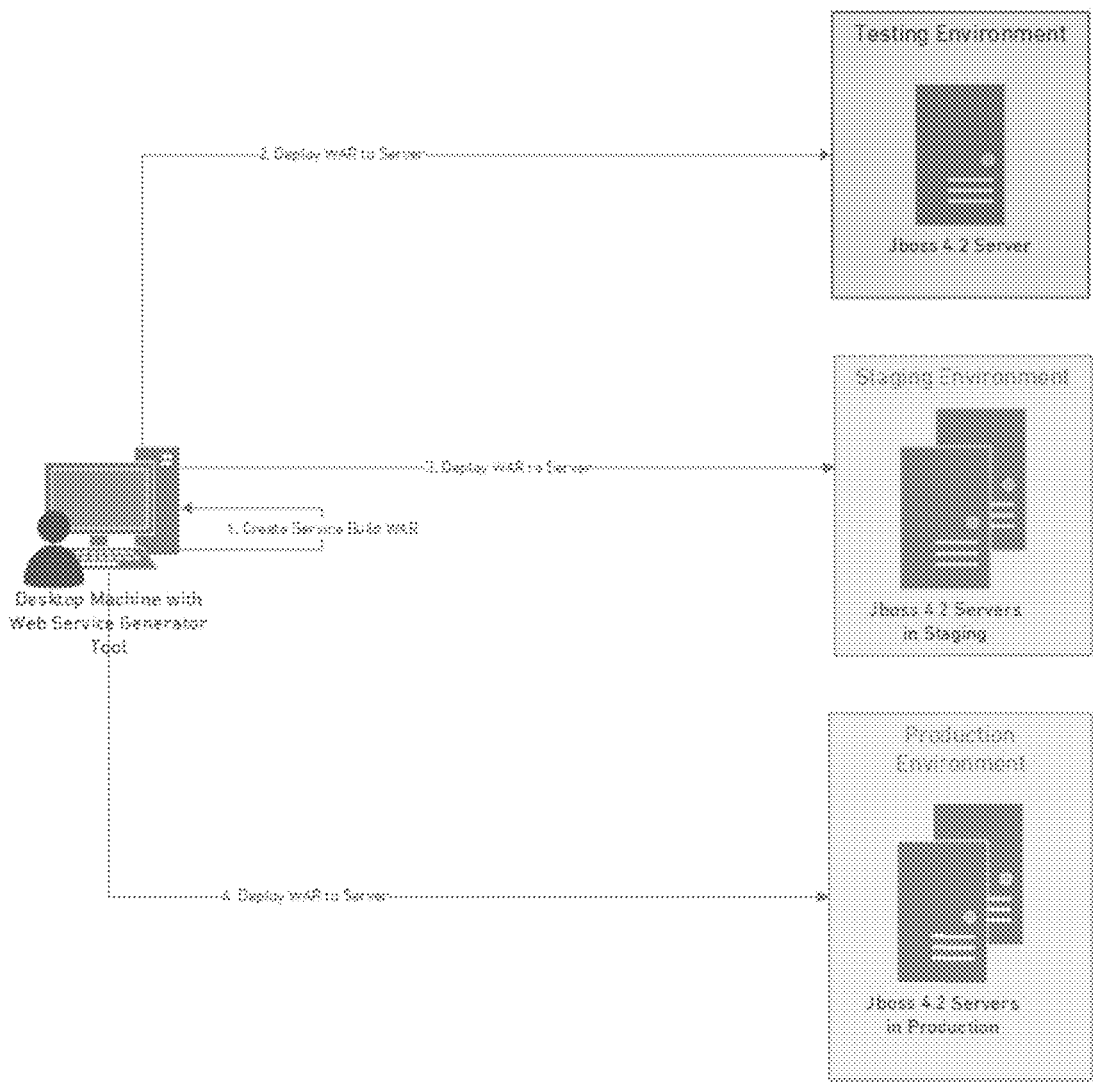
FIG. 2A is a diagram of an exemplary architecture of an example web service generator deployed across multiple environments in accordance with some implementations.

In some implementations, a web service application/generator is implemented in Java™ Swing language. The web service application/generator has the ability to deploy its JAR build in different server environments such development, testing, staging and production in some implementations. FIG. 2A is a diagram of an exemplary architecture of an example web service generator deployed across multiple environments in accordance with some implementations. In some implementations, the web service application/generator creates SOAP-based web services using Enterprise JavaBeans™ (EJB) 2.1 and Apache CXF (or similar tools). In some implementations, the result of a SOAP-based service is a JAR build that can be deployed on a Jboss 4.2 server (see FIG. 2A). Thr JAR file contains the source code of the created service is provided by a web service application/generator in some implementations.

Figure 2B:
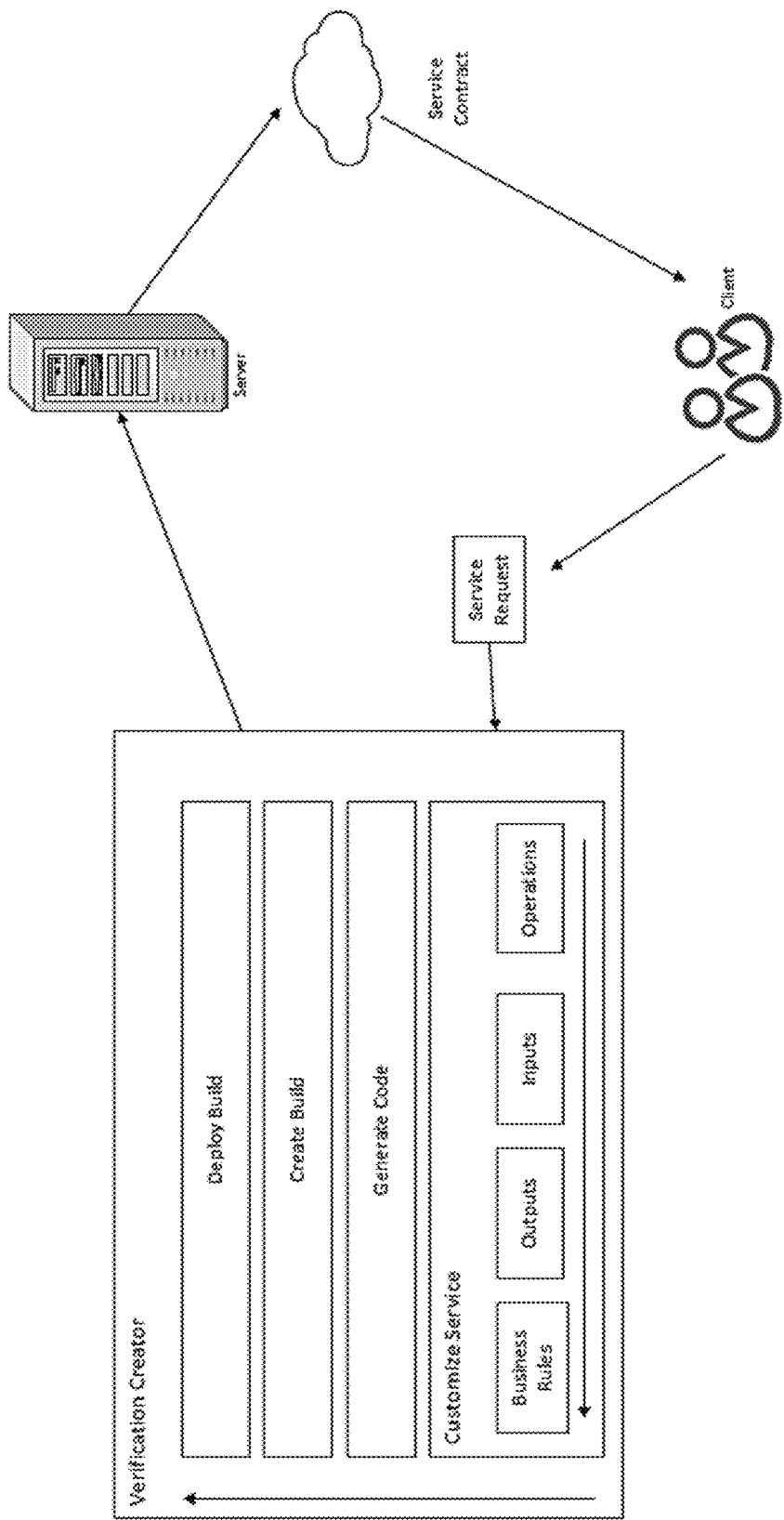
FIG. 2B is a diagram of an exemplary architecture of an example verification service creator of an exemplary web service generator in accordance with some implementations.

FIG. 2B is a diagram of an exemplary architecture of an example verification service creator of a web service generator in accordance with some implementations. The client shown in FIG. 2B makes a service request to the verification creator, which creates a verification service based on the inputs, outputs, business rules, and operations (i.e., methods or capabilities) that are selected by the client and customized by the client where needed.

The verification creator in FIG. 2B creates the verification service using modules to build a service, deploy the service, and generate code. The service can be customized based on the selected inputs and outputs, business rules, and the selected operations. The service is deployed to a server upon creation and the corresponding service contract is sent to the client.

Algorithm

Figure 3:
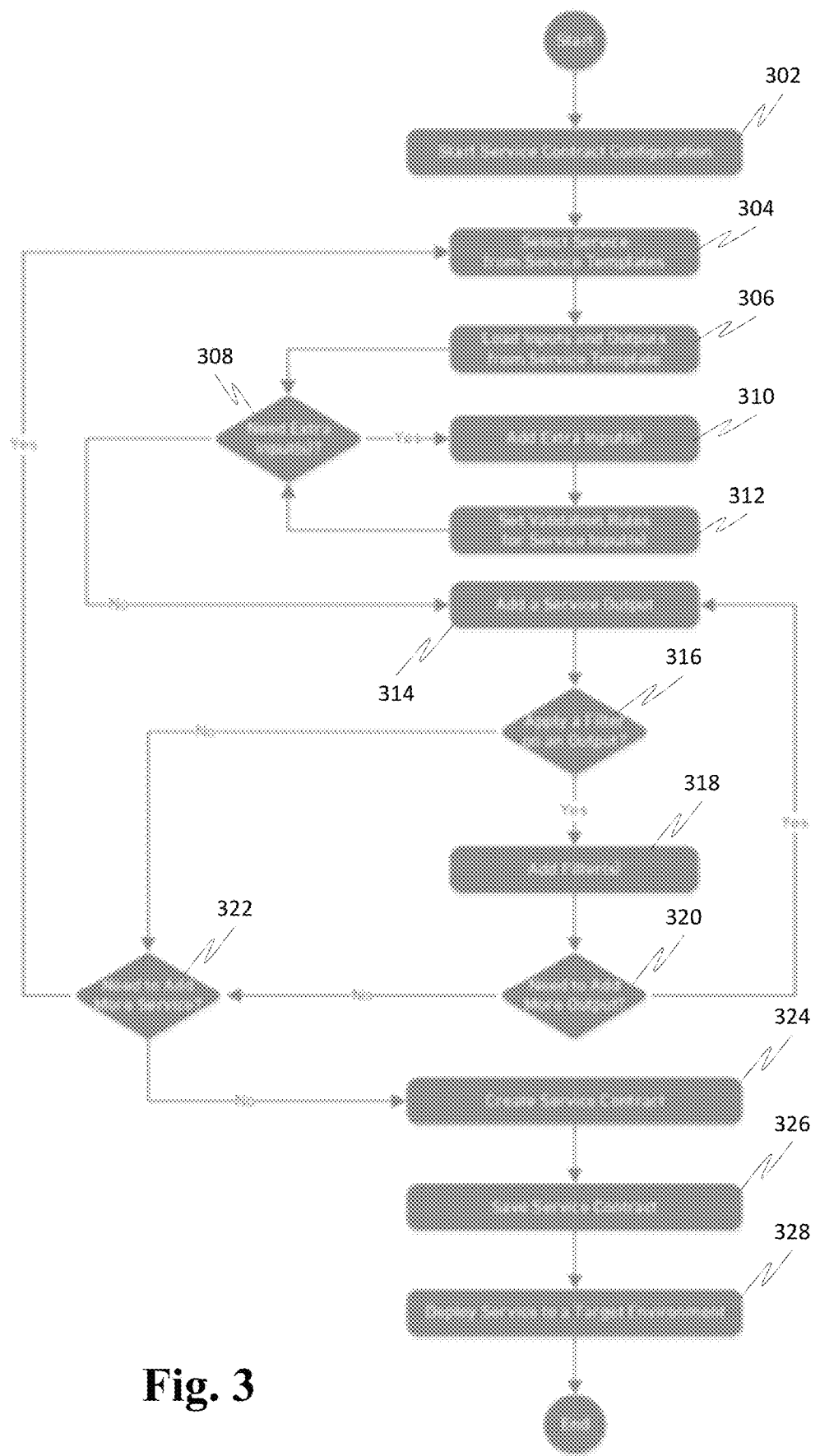
FIG. 3 is a flow diagram of an example algorithm for creating and deploying a service in accordance with some implementations.

FIG. 3 is a flow diagram of an example of creating and deploying a service in accordance with some implementations. Step 302 initiates the service required configurations, such as the path of templates and where the profile will be stored. In some implementations, a service application comprises a set of configurations and generates a set of artifacts. Configurations includes service templates and/or a directory path to which a generated service profile and/or an integration guide document are saved. Artifacts include service deployment files (i.e., a WAR file or the like), source code (e.g., Java or other suitable language), and/or the integration guide document. In some implementations, the service application provides a service template editor for a user to update a service template (i.e., configuration) by adding assets/data sources/inputs/outputs.

In some implementations, a service template comprises one or more of the following:
One or more assets or data sources, where an asset or a data source can be a data store, a web service, or an API;
One or more input fields and one or more output fields, where an input/output field can be a name or a type;
Logging collections, where each transaction is logged and stored;
Error messages, which include expected error messages.

Step 304 includes selecting a service from a service template. In some of the implementations, when a web service application is initiated, the service application loads all configured service templates and displays the loaded templates to a user as 'available' service templates. In some implementations, the user can then select a method (or capability) from a service template. In some implementations, the user can also specify a name for the selected method or capability. In some implementations, the specified name appears in the generated Web Service Description Language (WSDL) as the name of an operation corresponding to the selected method or capability.

Step 306 includes loading inputs and outputs from the service template. In some implementations, a user selects required inputs from a list of available inputs. Some of the inputs (e.g., user credentials and language) are mandatory according to the configuration of a service template in some implementations. Step 308 includes checking for addition of additional inputs (if needed). In some implementations, a user can select and define other (e.g., additional) inputs that can further be used as a means to cross-check for verification purposes. Additional inputs are added in step 310 if that selection is made in step 308.

In step 312, validation rules for (service) inputs are defined. In some of the implementations, a validation rule can be specified and applied to one or more input fields. For example, validation rules can pertain to field length, field type, etc. Steps 308, 310 and 312 are repeated until the required inputs and corresponding validation rules are added. Step 314 includes addition of service outputs. In some implementations, a user selects outputs from a list of available outputs. In some implementations, the user can rename the selected outputs. An optional step 316 includes filtering a selected output.

In step 316, a determination is made as to whether a filter is to be applied to an output. If yes, one or more filters are added and applied to the selected output in step 318. After step 318, a determination is made in step 320 as to whether more outputs need to be added. If yes, steps 314 to 320 are repeated until all of the required outputs have been added successfully. If a determination is made in step 320 that an output does not need to be added, a determination is then made in step 322 as to whether a new service needs to be added. If a new service needs to be added, steps 304 to 322 are repeated until all of the required services have been added successfully. If not, and a determination is made in step 322 that a service does not need to be added, a service contract is created in step 324, saved in step 326, and deployed to a target environment in step 328.

The output result can be filtered by adding filters in some implementations. In some implementations, there are two types of filters that can be applied to the output result based on the type of result set: single-row output and multi-row output. The filter on a single-row output is called a condition, for example, don't return a person result if the age is less than 40. In some cases, multi-row outputs need to be filtered, for example, removing a set of rows corresponding to people in a specific age range from the result set. In some implementations, another type of output can be added to a service as a computed field for masking and/or categorization purposes. For example, a new output may be created to return a specific flag in cases where a person's age is less than 10, without returning the actual age. In some of the implementations, a user is allowed to customize exception messages returned by the service. Such customized exception messages can be configured in the service template by a user.

In some implementations, the steps of addition of service outputs and/or filters are performed iteratively until the required filters are applied to the required outputs. In some implementations, after all of the required outputs and filters are added, a service contract is created and saved. In some implementations, the service is deployed to a target environment.

In some implementations, a web service application engine is developed as a smart tool that has a set of configurable service templates. The web service application engine parses these templates and populates its methods (capabilities) and fields in order to allow users to create and configure one or more web services based on the user requirements.

Backward Compatibility and Documentation

In some implementations, a web service application and/or generator is configured to compare the WSDL generated (during service creation and deployment) to an existing WSDL. This comparison feature can ensure, in some implementations, that any changes to business requirements do not affect existing client contracts, and that backward compatibility with existing contracts is preserved where the client instructs that existing contracts should not be affected. In some implementations, a document generator is used to generate an integration guide document, which describes all of the generated web service(s), along with inputs, outputs, and error messages corresponding to each of the generated web service(s).

Figure 4:
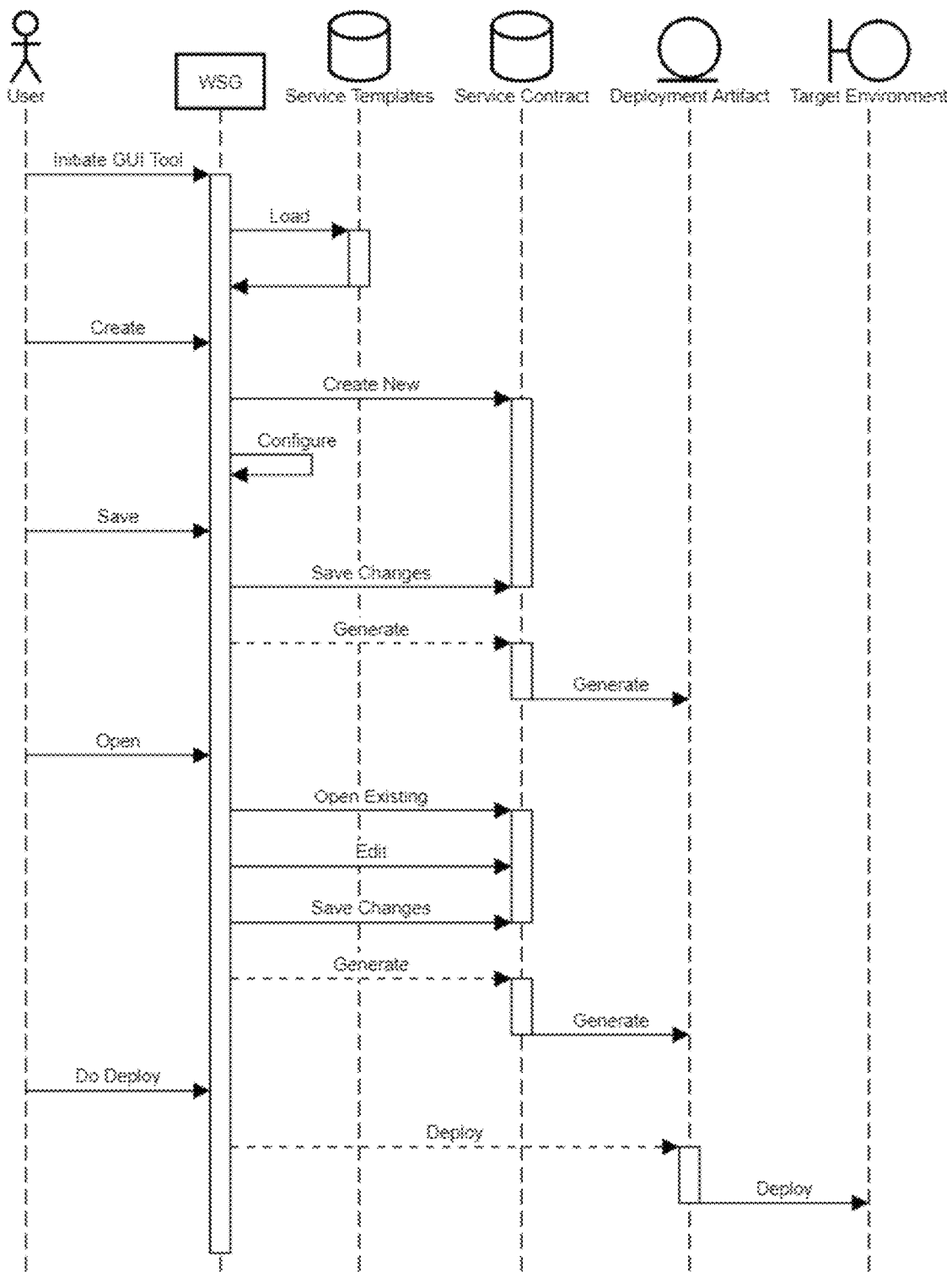
FIG. 4 is a sequence diagram of an example sequence of user interactions with a web service generator in accordance with some implementations.

FIG. 4 is a sequence diagram of an example sequence of user interactions with a web service generator in accordance with some implementations.

Creating a Service Contract

Figure 5:
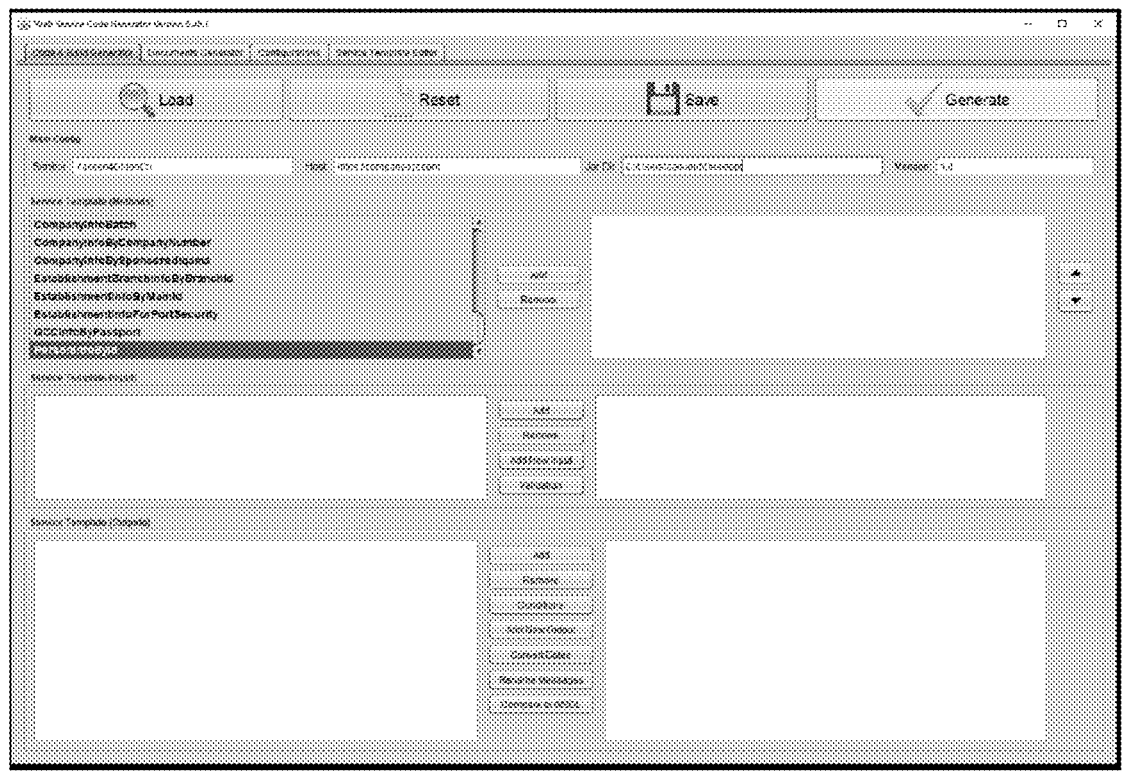
FIG. 5 shows an example interface of an exemplary web service generator for creating a service contract in accordance with some implementations.

FIG. 5 shows an example interface of an exemplary web service generator for creating a service contract in accordance with some implementations. In some implementations, a web service generator (or web service application) is launched with a new service contract. A user has the option to load an existing contract for modification in some of the implementations.

Adding a Service Capability (Method)

Figure 6:
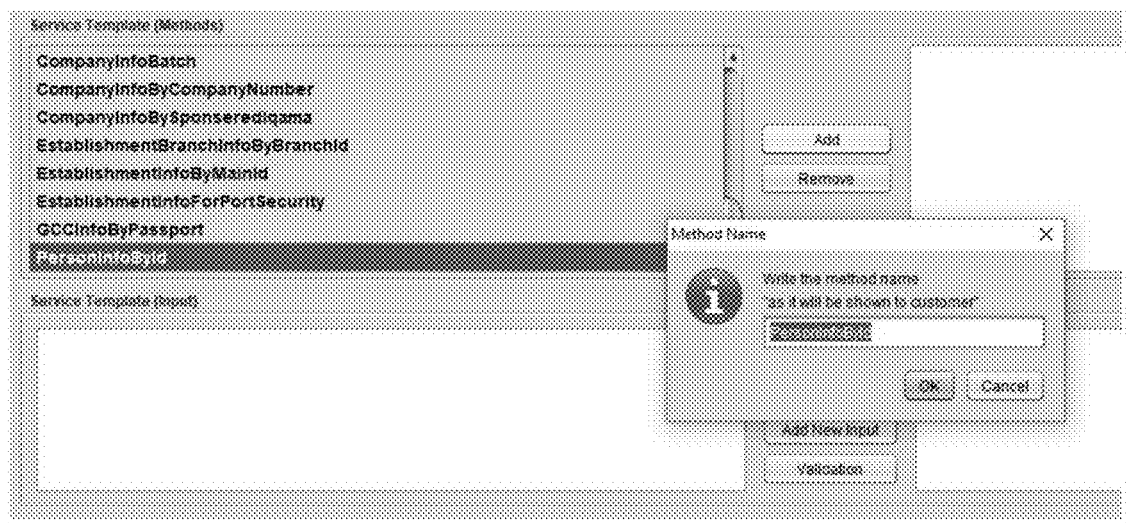
FIG. 6 shows an example interface of an exemplary web service generator for adding a service capability in accordance with some implementations.

FIG. 6 shows an example interface of an exemplary web service generator for adding a service capability in accordance with some implementations. In some implementations, the user selects a service capability or method from the service template methods menu, clicks the Add button, names the selected capability, and clicks the OK button, as shown in FIG. 6.

Figure 7:
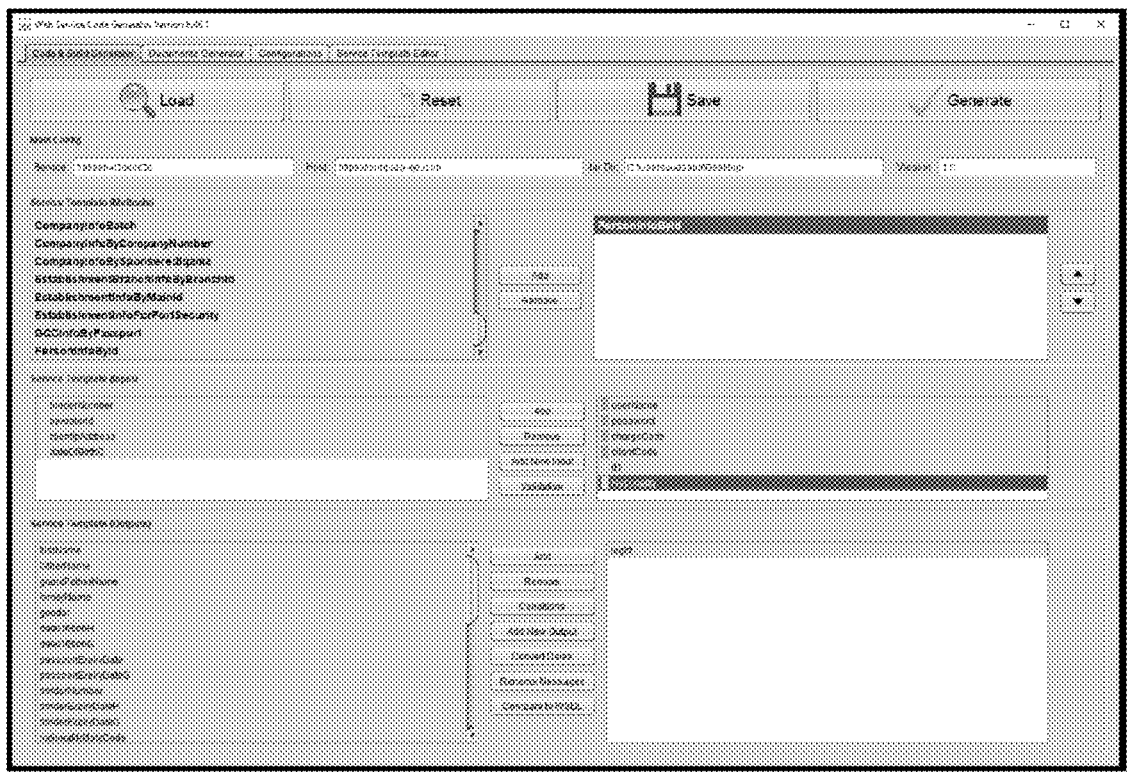
FIG. 7 shows an example interface of an exemplary web service generator for viewing an added service capability in accordance with some implementations.

The service capability is now added to the contract. FIG. 7 shows an example interface of an exemplary web service generator for viewing an added service capability in accordance with some implementations. FIG. 7 shows a set of inputs and outputs based on the service template selected. The user can select inputs/outputs from the menu to add to the contract.

Service Capability's Inputs, Validation Rules, and Outputs

Figure 8:
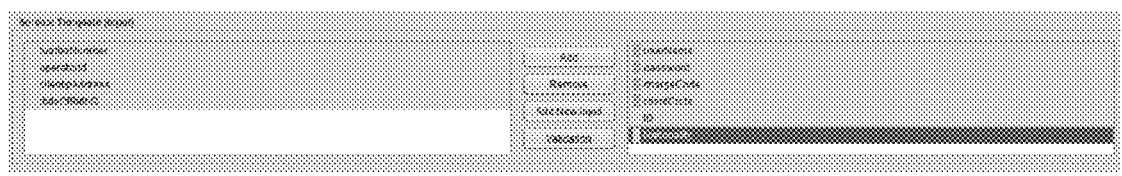
FIG. 8 shows an example interface of an exemplary web service generator for selecting service capability inputs in accordance with some implementations.
Figure 9:
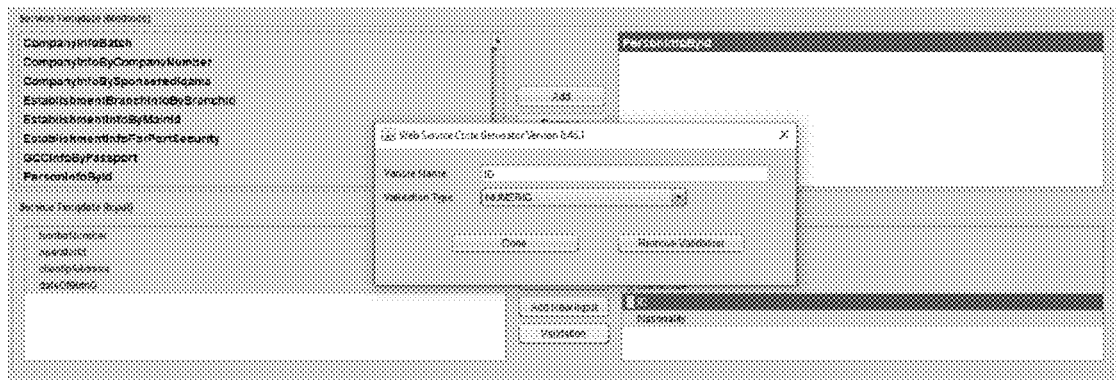
FIG. 9 shows an example interface of an exemplary web service generator for adding input validation rules in accordance with some implementations.
Figure 10:
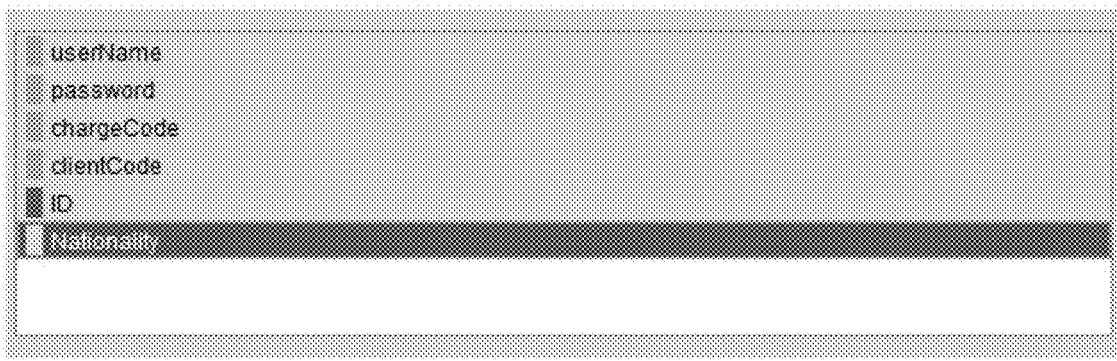
FIG. 10 shows an example interface of an exemplary web service generator for viewing an added input validation rule in accordance with some implementations.

In some implementations, predetermined inputs are preselected. In some implementations, the user can add additional inputs to the service capability if/when needed. FIG. 8 shows an example interface of an exemplary web service generator for selecting (i.e., adding) service capability inputs in accordance with some implementations. In some implementations, the user can also add one or more validation rules to one or more inputs. FIG. 9 shows an example interface of an exemplary web service generator for adding input validation rules in accordance with some implementations. In some implementations, the user can select the Validation button shown in FIG. 9 for a selected input to add a validation rule for the selected input. In some implementations, once validation is added, inputs with one or more validations are highlighted with a green label to indicate that the input has validation(s). FIG. 10 shows an example interface of an exemplary web service generator for viewing an added input validation rule (highlighted in green) in accordance with some implementations.

Service Capability's Outputs and Filters

Figure 11:
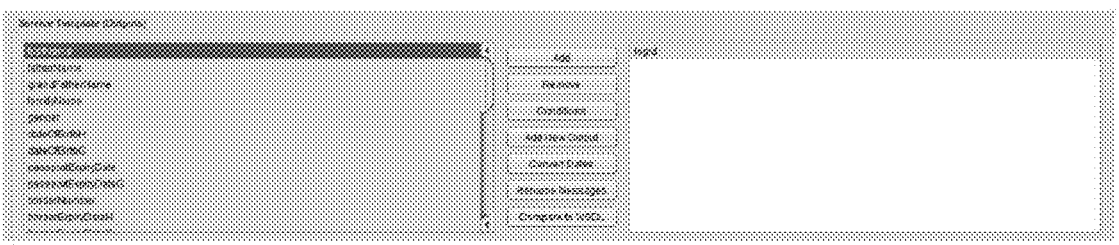
FIG. 11 shows an example interface of an exemplary web service generator for selecting service capability outputs in accordance with some implementations.
Figure 12:
FIG. 12 shows an example interface of an exemplary web service generator for viewing an added service capability's outputs in accordance with some implementations.

In some implementations, a user can add outputs to a service contract by selecting one or more outputs from a list of available service outputs. FIG. 11 shows an example interface of an exemplary web service generator for selecting service capability outputs in accordance with some implementations. FIG. 12 shows an example interface of an exemplary web service generator for viewing an added service capability's outputs in accordance with some implementations. In some implementations, once an output is selected (i.e., added), the user can further add filters or conditions to process or transform the selected output result set.

Figure 13:
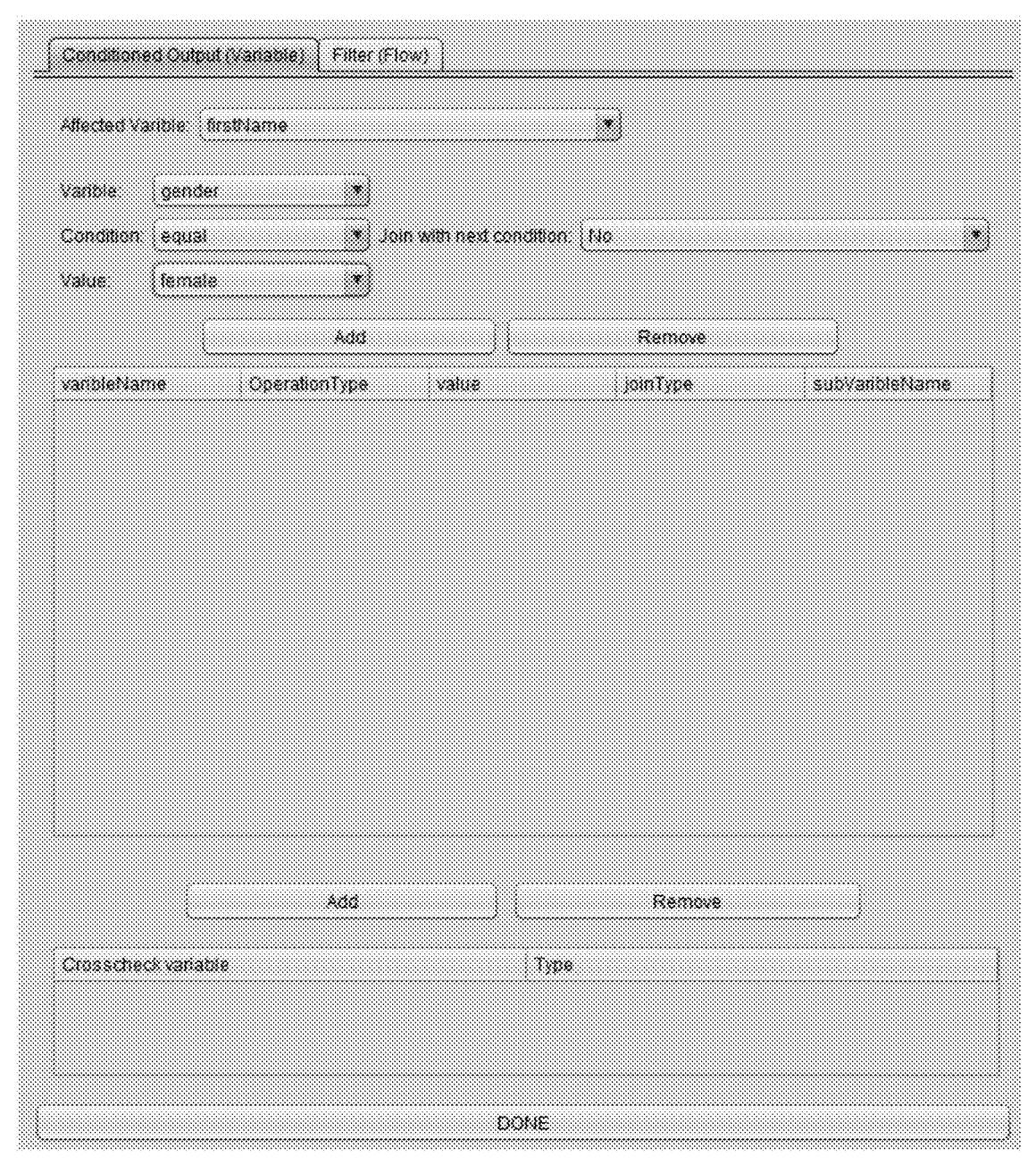
Figure 14:
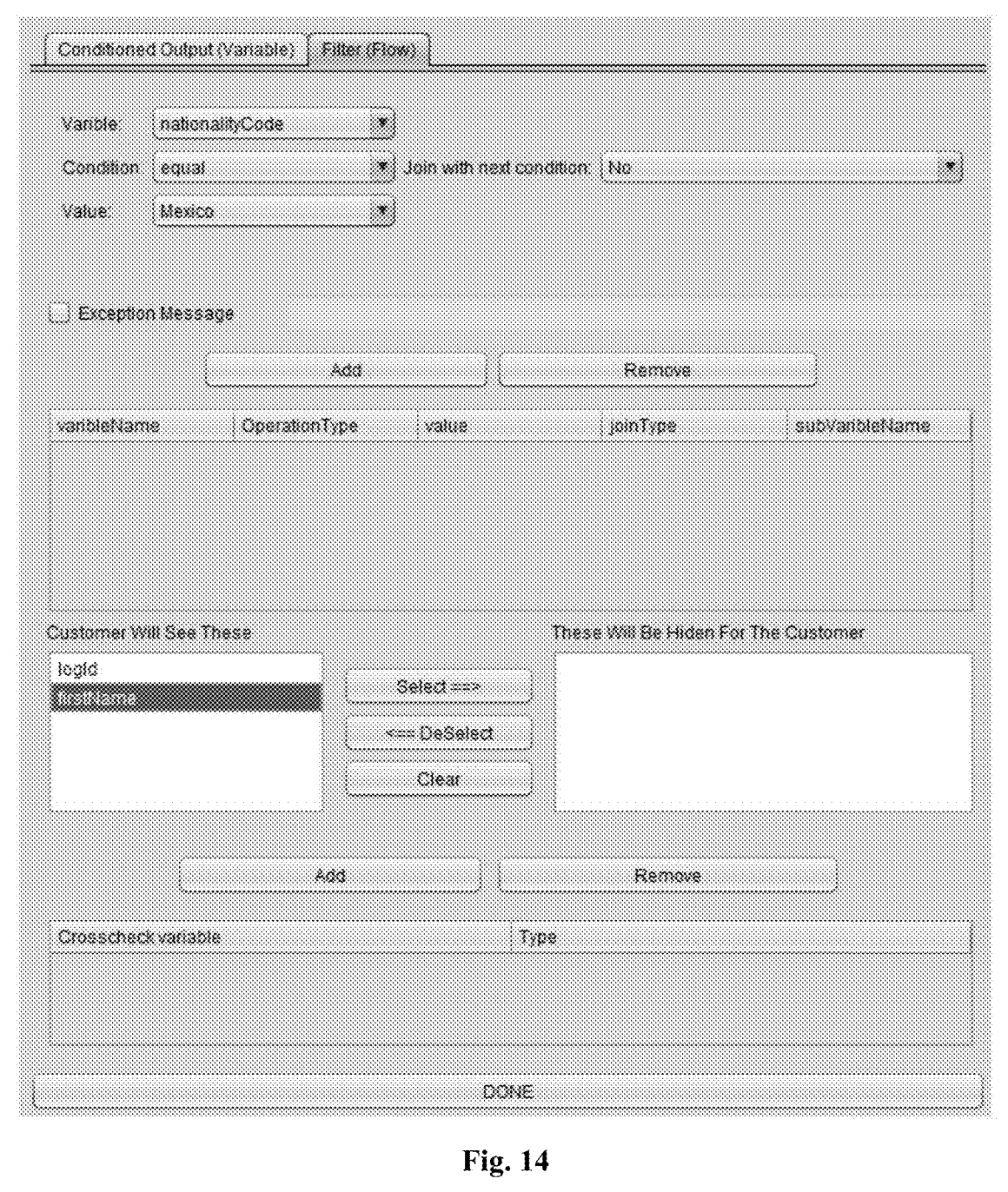

FIG. 13 shows an example interface of an exemplary web service generator for viewing the output of a single-row filter in accordance with some implementations. In some implementations, when a user selects the Conditions button shown in FIG. 11 or FIG. 12, the interface shown in FIG. 13 appears to provide the user ability to set-up a single-row filter or condition. In some implementations, the user will then select the output for which the filter/condition is to be applied. For example, the output may not be shown to a client if the output satisfies the condition (i.e., the output is filtered out). In some implementations, the user can apply more than one filter (i.e., complex or multiple filters) by joining one or more filters with a logical operator. FIG. 14 shows an example interface of an exemplary web service generator for viewing the output(s) of a multi-row filter in accordance with some implementations.

As shown in FIG. 14, the user can also filter multi-row outputs based on one or more logical expressions. In some implementations, there is an option to completely hide all outputs using an exception message that will be returned to the web service caller.

Adding Service Capabilities

In some implementations, a user can repeat the previous steps to create more service capabilities on the same service profile. In some implementations, the end result is a web service contract containing selected methods, inputs, and outputs from the service template.

Service Template and Contract

In some implementations, a web service application (or web service generator) relies on configured files to provide service templates and generate the service contract file. In some implementations, these files are created in an industry standard data format, for example, Extensible Markup Language (XML) format in some implementations.

Figure 15:
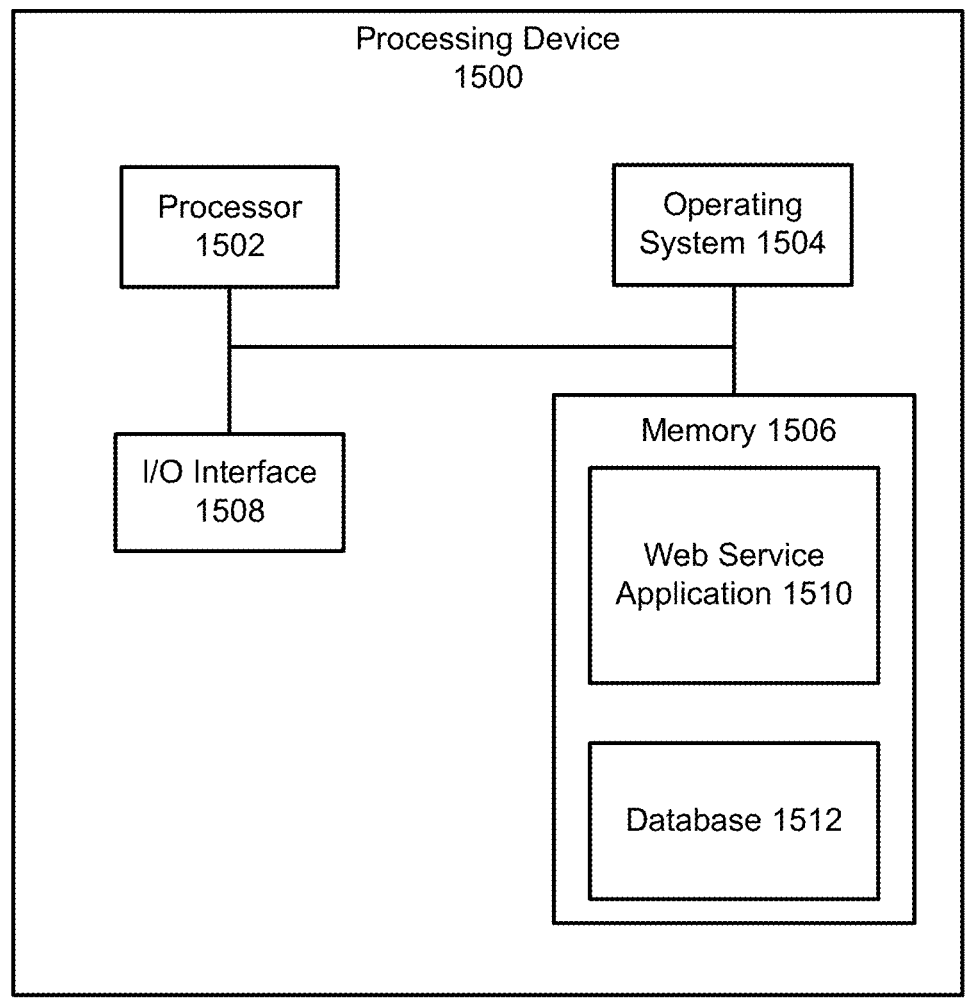
FIG. 15 is a diagram showing an example computing device configured for creating, deploying, and controlling web services including simple object application protocol (SOAP) web services, for example, verification services in accordance with some implementations.

FIG. 15 is a block diagram of an example processing device 1500, which may be used to implement one or more features described herein. In one example, device 1500 may be used to implement a computer device or system for creating, deploying, and controlling web services including simple object application protocol (SOAP) web services including, for example, data verification services, as described herein, and perform the appropriate method implementations described herein. Device 1500 can be any suitable computer system, server, or other electronic or hardware device. For example, the device 1500 can be a mainframe computer, a desktop computer, a workstation, a portable computer, or an electronic device (portable device, mobile device, cell phone, smart phone, tablet computer, television, TV set top box, personal digital assistant (PDA), media player, game device, wearable device, etc.). In some implementations, device 1500 includes a processor 1502, an operating system 1504, a memory 1506, and an input/output (I/O) interface 1508.

Processor 1502 can be one or more processors and/or processing circuits to execute program code and control basic operations of the device 1500. A "processor" includes any suitable hardware and/or software system, mechanism, or component that processes data, signals, or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1506 is typically provided in device 1500 for access by the processor 1502, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1502 and/or integrated therewith. Memory 1506 can store software operating on the device 1500 by the processor 1502, including an operating system 1504, one or more applications 1510, and a database 1512. In some implementations, the one or more applications 1510 can include instructions that direct processor 1502 to perform the functions described herein (e.g., as shown in the figures: FIG. 5 to FIG. 14).

For example, application 1510 can include creating, deploying, and controlling web services including simple object application protocol (SOAP) web services, for example, verification services, as described herein. Any of software in memory 1504 can alternatively be stored on any other suitable storage location or computer-readable medium. In addition, memory 1504 (and/or other connected storage device(s)) can store machine learning model (e.g., SVM) information and/or other instructions and data used in the features described herein. Memory 1504 and any other type of storage (magnetic disk, optical disk, magnetic tape, or other tangible media) can be considered "storage" or "storage devices."

I/O interface 1508 can provide functions to enable interfacing the processing device 1500 with other systems and devices. For example, network communication devices, storage devices (e.g., memory and/or database), and input/output devices can communicate via interface 1508. In some implementations, the I/O interface 1508 can connect to interface devices, including input devices (keyboard, pointing device, touchscreen, camera, scanner, microphone, etc.) and/or output devices (display device, speaker devices, printer, motor, etc.).

For ease of illustration, FIG. 15 shows one block for each of processor 1502, memory 1506, I/O interface 1508, and software block 1510. These blocks may represent one or more processors or processing circuitries, operating systems, memories, I/O interfaces, applications, and/or software modules. In other implementations, device 1500 may not have all of the components shown and/or may have other elements, including other types of elements instead of, or in addition to, those shown herein.

In general, a computer that performs the processes described herein can include one or more processors and a memory (e.g., a non-transitory computer readable medium). The process data and instructions may be stored in the memory. These processes and instructions may also be stored on a storage medium such as a hard drive (HDD) or a portable storage medium or may be stored remotely. Note that each of the functions of the described embodiments may be implemented by one or more processors or processing circuits. A processing circuit can include a programmed processor, as a processor can include circuitry in some implementations. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk, or any other information processing device.

The processor may contain one or more processors and may even be implemented using one or more heterogeneous processor systems. According to certain implementations, the instruction set architecture of the processor can use a reduced instruction set architecture, a complex instruction set architecture, a vector processor architecture, a very large instruction word architecture. Furthermore, the processor can be based on the Von Neumann model or the Harvard model. The processor can be a digital signal processor, an FPGA, an ASIC, a PLA, a PLD, or a CPLD. Further, the processor can be an x86 processor by Intel or by AMD, an ARM processor, a Power architecture processor by, e.g., IBM, a SPARC architecture processor by Sun Microsystems or by Oracle, or other known CPU architecture processor.

The functions and features described herein may also be executed by various distributed components of a system. For example, one or more processors may execute the functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that is claimed.

The invention claimed is:

1. A computerized method to automatically generate source code for simple object application protocol (SOAP) web services, the method comprising:
   selecting, using one or more processors, a type of web service and a web service, wherein the web service is a verification service that verifies data across one or more data sources, wherein the one or more data sources correspond to data of one or more of a person, an organization, a vehicle, or an address;
   selecting, using the one or more processors, one or more inputs or one or more outputs corresponding to the type of web service, the inputs and the outputs being fields used as respectively as inputs to a request for verification using the verification service;
   inputting, using the one or more processors, one or more additional inputs, as one or more additional fields, to crosscheck the one or more inputs and validate values of the one or more inputs;
   defining, using the one or more processors, one or more conditions for the one or more outputs;
   mapping, using the one or more processors, at least one of the one or more outputs to a different value;
   automatically generating, using the one or more processors, source code files for two or more new web services simultaneously such that a respective source code file is configured to provide the respective web service when the source code is executed, wherein the respective automatically generated source code is based on one or more of the type of web service, the one or more inputs, the one or more outputs, or the one or more conditions;
   deploying, using the one or more processors, the source code files to a server; and
   generating, using the one or more processors, a document that lists one or more specifications of each of the web services.

2. The computerized method of claim 1, wherein the source code file is a Java™ program.

3. The computerized method of claim 1, wherein a profile is created when the web service is generated.

4. The computerized method of claim 3, wherein the profile is stored in an XML file.

5. The computerized method of claim 1,
   wherein a first input of a first web service of the two or more new web services differs from a second input of a second web service of the two or more new web services, and
   wherein a first output of the first web service differs from a second output of the second web service, and wherein the first web service is different from the second web service.

6. A system to automatically generate source code for simple object application protocol (SOAP) web services, the system comprising:
   one or more processors and a non-transitory computer readable storage having software instructions stored thereon configured to cause the one or more processors to:
   select a type of web service and a web service, wherein the web service is a verification service that verifies data across one or more data sources, wherein the one or more data sources correspond to data of one or more of a person, an organization, a vehicle, or an address;
   select one or more inputs or one or more outputs corresponding to the type of web service, the inputs and the outputs being fields used as respectively as inputs to a request for verification using the verification service;
   input one or more additional inputs, as one or more additional fields, to crosscheck the one or more inputs and validate values of the one or more inputs;
   define one or more conditions for the one or more outputs;
   map at least one of the one or more outputs to a different value;
   automatically generate, using the one or more processors, source code files for two or more new web services simultaneously such that a respective source code file is configured to provide the respective web service when the source code is executed, wherein the respective automatically generated source code is based on one or more of the type of web service, the one or more inputs, the one or more outputs, or the one or more conditions;
   deploy the source code files to a server; and
   generate a document that lists one or more specifications of each of the web services.

7. The system of claim 6, wherein the source code file is a Java™ program.

8. The system of claim 6, wherein a profile is created when the web service is selected.

9. The system of claim 8, wherein the profile is stored in an XML file.

10. The system of claim 6,
    wherein a first input of a first web service of the two or more new web services differs from a second input of a second web service of the two or more new web services, and
    wherein a first output of the first web service differs from a second output of the second web service, and wherein the first web service is different from the second web service.

11. The system of claim 6, wherein at least one of the one or more conditions is a business rule.

12. A non-transitory computer readable medium having instructions stored therein that, when executed by one or more processors, cause the one or more processors to automatically generate source code for simple object application protocol (SOAP) web services, the method comprising:
    selecting, using one or more processors, a type of web service and a web service, wherein the web service is a verification service that verifies data across one or more data sources, wherein the one or more data sources correspond to data of one or more of a person, an organization, a vehicle, or an address;
    selecting, using the one or more processors, one or more inputs or one or more outputs corresponding to the type of web service, the inputs and the outputs being fields used as respectively as inputs to a request for verification using the verification service;
    inputting, using the one or more processors, one or more additional inputs, as one or more additional fields, to crosscheck the one or more inputs and validate values of the one or more inputs;
    defining, using the one or more processors, one or more conditions for the one or more outputs;
    mapping, using the one or more processors, at least one of the one or more outputs to a different value;
    automatically generating, using the one or more processors, source code files for two or more new web services simultaneously such that a respective source code file is configured to provide the respective web service when the source code is executed, wherein the respective automatically generated source code is based on one or more of the type of web service, the one or more inputs, the one or more outputs, or the one or more conditions;

deploying, using the one or more processors, the source code files to a server; and generating, using the one or more processors, a document that lists one or more specifications of each of the web services.

13. The non-transitory computer readable medium of claim 12, wherein the source code file is a Java™ program.

14. The non-transitory computer readable medium of claim 12, wherein a profile is created when the web service is selected.

15. The non-transitory computer readable medium of claim 14, wherein the profile is stored in an XML file.

16. The non-transitory computer readable medium of claim 12, wherein a first input of a first web service of the two or more new web services differs from a second input of a second web service of the two or more new web services, and wherein a first output of the first web service differs from a second output of the second web service, and wherein the first web service is different from the second web service.

* * * * *